United States Patent

Davy et al.

(10) Patent No.: US 8,382,131 B2
(45) Date of Patent: Feb. 26, 2013

(54) SINGLE WHEEL SUSPENSION OF A NON-STEERABLE WHEEL OF A TWO-TRACK VEHICLE

(75) Inventors: Elsa Davy, Munich (DE); Dirk Schlichte, Munich (DE); Jakob Mueller, Munich (DE); Bernhard Paulus, Munich (DE); Alfred Pruckner, Munich (DE); Roland Koenig, Habach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/523,384

(22) Filed: Jun. 14, 2012

(65) Prior Publication Data

US 2012/0292874 A1 Nov. 22, 2012

Related U.S. Application Data

(63) Continuation of application No. PCT/EP2010/067478, filed on Nov. 15, 2010.

(30) Foreign Application Priority Data

Dec. 17, 2009 (DE) .................. 10 2009 058 728

(51) Int. Cl.
*B60G 3/22* (2006.01)
*B60G 11/15* (2006.01)
*B60G 7/02* (2006.01)
(52) U.S. Cl. ...... 280/124.153; 280/124.128; 280/124.11
(58) Field of Classification Search .......... 280/124.153, 280/124.133, 124.128, 124.13, 124.11, 124.125; *B60G 3/22, 3/20, 3/18, 11/15, 7/02*
See application file for complete search history.

(56) References Cited

U.S. PATENT DOCUMENTS

| 2,043,011 A | * | 6/1936 | Schjolin | 267/257 |
| 3,096,085 A | * | 7/1963 | Owens | 267/284 |
| 6,082,748 A | | 7/2000 | Hartmann et al. | |

FOREIGN PATENT DOCUMENTS

| DE | 42 03 057 A1 | 8/1993 |
| DE | 197 21 753 A1 | 11/1998 |
| DE | 10 2009 038 424 A1 | 2/2011 |
| EP | 0 001 344 A1 | 4/1979 |
| EP | 0 113 333 A1 | 7/1984 |
| EP | 1 919 723 B1 | 11/2008 |
| FR | 846448 | 9/1939 |

OTHER PUBLICATIONS

German Search Report dated Oct. 22, 2010 including partial English-language translation (Nine (9) pages).
International Search Report dated Feb. 7, 2011 including English-language translation (Four (4) pages).

* cited by examiner

*Primary Examiner* — Paul N Dickson
*Assistant Examiner* — Keith Frisby
(74) *Attorney, Agent, or Firm* — Crowell & Moring LLP (57) ABSTRACT

A single wheel suspension of a non-steerable wheel of a two track vehicle includes two links pivotable relative to each other in respective planes, each being inclined less than 10° relative to the longitudinal and vertical directions of the vehicle. A first link, extending approximately in the longitudinal direction, functions as a wheel carrier. The first link is supported with an end section on the vehicle body via a pendulum support, which extends essentially in the vertical direction. The second link, extending approximately in the longitudinal direction, is supported in an articulated manner, on one side, on the body with only one kinematic rotational degree of freedom and on the other side to the first link between the wheel bearing and a pendulum support fastening point with only one kinematic rotational degree of freedom. No other wheel guiding link is provided, except for a connecting element.

14 Claims, 5 Drawing Sheets

SINGLE WHEEL SUSPENSION OF A NON-STEERABLE WHEEL OF A TWO-TRACK VEHICLE

CROSS-REFERENCE TO RELATED APPLICATIONS

This application is a continuation of PCT International Application No. PCT/EP2010/067478, filed Nov. 15, 2010, which claims priority under 35 U.S.C. §119 from German Patent Application No. DE 10 2009 058 728.4, filed Dec. 17, 2009, the entire disclosures of which are herein expressly incorporated by reference.

BACKGROUND AND SUMMARY OF THE INVENTION

The invention relates to a single wheel suspension of a non-steerable wheel of a two track vehicle.

The rear axles of passenger vehicles with wheels that cannot be typically steered, have, as is well-known, a decisive impact on the driving stability and safety of the vehicle. In order to attain a stable handling of the vehicle in virtually all driving situations, modern rear axles are designed with such kinematic properties that they generate a negative camber angle on the wheel by way of the spring compression travel in order to maximize the transferable lateral forces relative to the vehicle body. In addition, a toe-in angle at the wheel is desired in terms of the kinematic effects over the spring compression travel of the wheel relative to the vehicle body and in terms of the elastokinematic effects under the longitudinal forces acting on the wheel (in particular, by decelerating), in order to generate an understeering handling of the vehicle and to prevent the rear from suddenly breaking away when there is a change in the wheel load. Such a behavior that matches the above general description is distinguished by relatively costly axle designs, for example in the form of five link axles or semi-trailing arm axles. However, these axle designs have not only the drawback of high costs, but they also have additionally a high installation space requirement. In contrast, the so-called torsion beam rear axles, which are known to the person skilled in the art, are more advantageous, but they also exhibit certain drawbacks with respect to the driving dynamics of motor vehicles.

Working on this basis, there is a need for a single wheel suspension that is advantageous or attractive with respect to the driving dynamics of the motor vehicle and that is distinguished by a small installation space requirement and a simple design.

The solution of this problem lies in a single wheel suspension of a non-steerable wheel of a two track vehicle (also known as a double or dual track vehicle) having two links, which can be pivoted relative to each other in a plane, wherein each of the planes is inclined by not more than 10° (or more specifically by not more than an angle in an order of magnitude from 6° to) 10° relative to the longitudinal direction of the vehicle and by not more than 10° (or more specifically by not more than an angle in an order of magnitude from 6° to 10°) relative to the vertical. Furthermore, the following features are present. The first link, which extends approximately in the longitudinal direction of the vehicle, also assumes the function of a wheel carrier (known to the skilled person in the art), in that a wheel bearing is fastened in an end section of the link in a receptacle; and the vehicle wheel is mounted in a rotational manner on the first link by way of the wheel bearing. Furthermore, the first link is supported with its other end section on the vehicle body by way of a pendulum support, which extends essentially in the vertical direction in the as-designed position. The other, second link, which extends essentially in the longitudinal direction of the vehicle, is supported on the one side in an articulated manner on the vehicle body with only one kinematic rotational degree of freedom and on the other side is connected in an articulated manner to the first link between the wheel bearing and the fastening point of the pendulum support with only one kinematic rotational degree of freedom. The wheel is guided relative to the vehicle body only by way of these two links. That is, no other wheel guiding link is provided, save for a connecting element, which may be provided, if desired, between the first link and the second link (in order to represent the articulated connection between these two link).

The above-described features provide an extremely compact single wheel suspension that requires very little installation space especially when viewed in the transverse direction of the vehicle. As a result, the single wheel suspension makes available a large amount of useable free space between the two wheels of a vehicle axle, in particular the rear axle due to the non-steerable wheels. Of course, it is also possible to permit slight elastokinematic steering movements of the wheel. Furthermore, a compression and decompression movement of the wheel in the vertical direction relative to the vehicle body may affect small desired changes in the track (toe-in), and in particular, owing to the slight inclination in the planes, in which each of the two links can be kinematically pivoted. In this respect these planes are inclined, as stated, relative to the vertical and/or relative to the longitudinal direction of the vehicle. Hence, a desired toe-in change and/or camber change when the wheel is running and/or when external forces are being applied and thus, the desired driving stability of a single wheel suspension, can be produced with a pivoting movement of the links in these planes.

The above concept "kinematically pivotable" is used to explicitly exclude the elastokinematic effects known to the person skilled in the art. Since each of the two links can be kinematically pivoted exclusively in one plane, each link has only one single kinematic rotational degree of freedom. In addition to this kinematic rotational degree of freedom it is also possible for the movements of the (respective) link to deviate slightly, subject to the corresponding action of the forces, from the (respective) degree of freedom even when suitable rubber bearings are provided. However, just slightly differing movements can take place only in a rubber bearing, assigned to the link, without the influence of correspondingly large forces and without elastic deformations.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
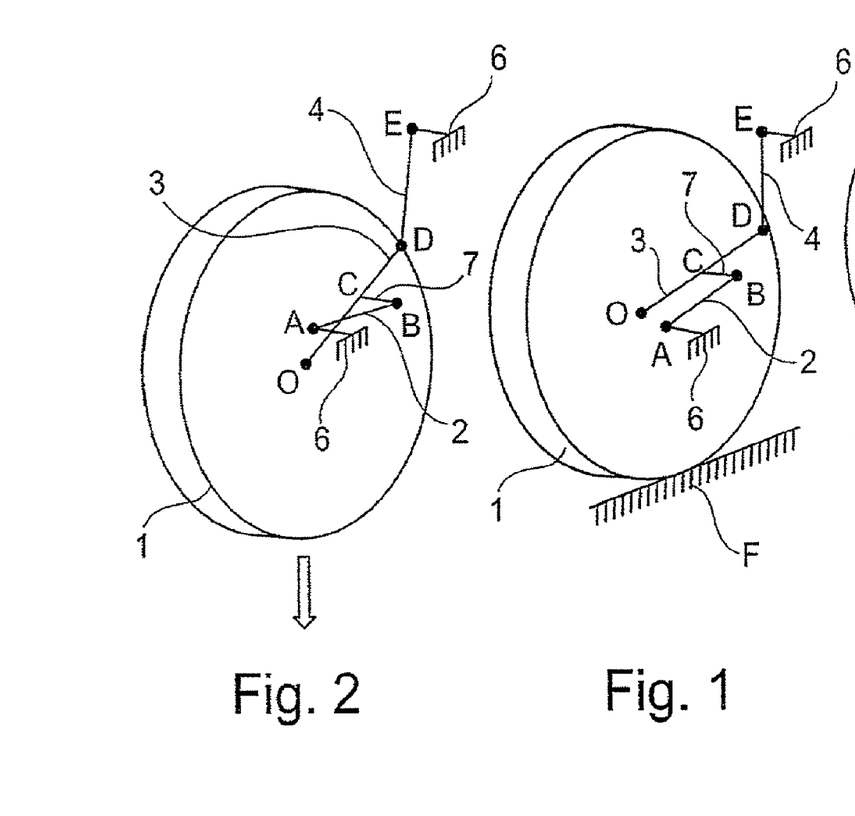
FIG. 1 is a schematic representation of a wheel in order to elucidate the underlying principles of the present invention, in which the wheel is shown in an as-designed position relative to the vehicle body.
FIG. 2 is a schematic representation of the wheel in order to elucidate the underlying principles of the present invention, in which the wheel is in a decompressed state relative to the vehicle body.
Figure 3:
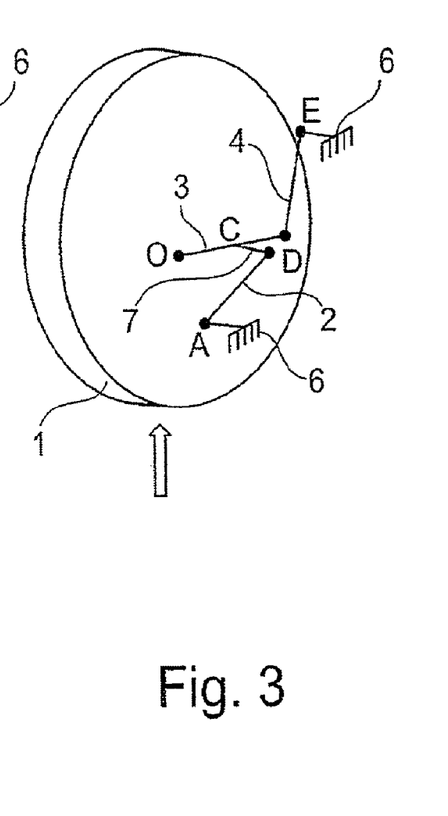
FIG. 3 is a schematic representation of the wheel in order to elucidate the underlying principles of the present invention, in which the wheel is in a compressed state relative to the vehicle body.

One exemplary embodiment is explained below at first with reference to the accompanying FIGS. 1 to 3 in order to elucidate the underlying principles and then with reference to FIGS. 4 to 7 in order to describe details of the exemplary design. To begin with, FIGS. 1 to 3, which are described first, show an inventive single wheel suspension in various states of compression. In this context FIG. 1 shows the as-designed position of the wheel relative to the vehicle body; whereas FIG. 2 shows the wheel in a decompressed state relative to the vehicle body; and FIG. 3 shows the wheel in the compressed state relative to the vehicle body.

The reference numeral 1 marks the left rear (and non-steerable) wheel of a passenger vehicle. This wheel is mounted in a rotatable manner in the conventional way about the point O by way of the wheel bearing. Moreover, the letter "O" is also used below to identify the wheel bearing.

The wheel bearing O is fastened directly or indirectly to an end section of a first link 3 of the wheel suspension. This first link 3, presented in a vertical projection (for example, perpendicular to the track F), extends approximately in the longitudinal direction of the vehicle. Moreover, this link 3 also extends in such a manner to be explained in detail below that this first link 3 can be kinematically pivoted in a more or less vertical plane that is inclined by not more than an angle in an order of magnitude of 6° to 10° relative to the vertical and is inclined by not more than by an angle in an order of magnitude of 6° to 10° relative to the longitudinal direction of the vehicle. The concept "kinematically pivotable" is supposed to exclude, as stated above, the elastokinematic effects known to the person skilled in the art, so that the pivoting movement having only one kinematic rotational degree of freedom is implemented with only one corresponding articulated attachment, which shall be explained in more detail below. In the specific case, the first link 3 is connected in a correspondingly articulated manner to a second link 2.

The latter second link 2 of the wheel suspension also extends, when viewed in a vertical projection (for example, perpendicular to the track F), approximately in the longitudinal direction of the vehicle (that is, in the direction of the longitudinal axis of the vehicle) and can be pivoted in an essentially vertical plane that is inclined by not more than an angle in an order of magnitude of 6° to 10° relative to the vertical and is inclined by not more than an angle in an order of magnitude of 6° to 10° relative to the longitudinal direction of the vehicle. For this purpose an end section of this second link 2 is supported on or is connected in an articulated manner to the vehicle body at point A in such a way that the second link can be pivoted about this point A with only one kinematic rotational degree of freedom. Thus, this point A shows the position of the corresponding joint, by which the second link 2 is guided, as described above, in a pivoted manner relative to the vehicle body 6 (which is shown only in an abstract fashion).

The other end section of the second link 2 is connected in an articulated manner to the first link 3 with only one kinematic rotational degree of freedom. This articulated connection forms or describes an axis of rotation 7* that extends through the points B, C. This articulated connection can be implemented with a connecting element—for example, a connecting pin 7 having end points B, C. In this case the first link 3 and the second link 2 can be pivoted about this connecting pin 7, which extends more or less horizontally in essence in the transverse direction of the vehicle owing to the described orientation and the freedom of movement of these two links 2, 3. Thus, the point B shows the position of a corresponding joint, by which the second link 2 can be pivoted about the axis of rotation 7*; and the point C shows the position of a corresponding joint, by which the first link 3 can be pivoted, as described above, about the axis of rotation 7*.

The latter articulated connection between the two links 3, 2 is located on the first link 3, when viewed in the longitudinal direction of the vehicle (in this case approximately in the middle of the link), but this connection can also be configured in some other place. In contrast, the decisive factor is that the first link 3 has an end section that is situated opposite the wheel bearing O and which is supported, viewed in the vertical direction, indirectly on the vehicle body 6. For this purpose a so-called pendulum support 4 is provided. The pendulum support 4 is supported on the first link 3 at point D and on the vehicle body 6 at point E preferably by way of a ball joint (or a functionally identical joint for a rubber joint that lends itself well for such a support) that is oriented more or less vertically. In this case, the points D, E show the position of such a joint. With these points this pendulum support 4 connects only one (1) kinematic degree of freedom of the wheel suspension.

The basic function of the above-described single wheel suspension lies in the fact that the wheel 1 is guided kinematically with only one single remaining degree of freedom by use of just the two links 3, 2 in interaction with the pendulum support 4. This single remaining degree of freedom permits, according to FIG. 3, a compression movement of the wheel 1 relative to the vehicle body 6 or, according to FIG. 2, a decompression movement of the wheel 1 relative to the vehicle body 6. At the same time the described and quasi scissors-like arrangement of the two links 3, 2 enables a relatively large vertical movement of the point O, that is, movement of the center point of the wheel or the wheel bearing O, in the event of a simultaneous minimal or just small horizontal movement of the point D. Owing to the approximately linear guide of point D by the pendulum support 4, an approximately linear guide of point O takes place in at least a larger surrounding area about the as-designed position (according to FIG. 1).

The particular advantage of the above-described single wheel suspension lies in its small installation space requirement, especially when viewed in the transverse direction of the vehicle.

Since there is no need for a wheel guiding link (or rather there is no wheel guiding link), which extends in the transverse direction of the vehicle or, more specifically, when viewed in a vertical projection is inclined by a significant angular amount relative to the longitudinal axis of the vehicle, this installation space between the two wheels of an axle exhibiting this wheel suspension is not limited by wheel guiding links. For example, a passenger vehicle has ample space for a trunk or for electric energy accumulators. (In this case the statement that there are no links that extend in the transverse direction of the vehicle is to be understood in the sense that the connecting pin 7 (mentioned as an example), by which the two links 3, 2, which extend in essence in the longitudinal direction of the vehicle, are connected together in an articulated manner like a pair of scissors so that the links can be pivoted in essence about the transverse axis of the vehicle, is not a wheel guiding link.)

An especially compact and, therefore, advantageous arrangement is produced when, in addition to the above-described features, the second link 2 and the first link 3 with its section between the wheel bearing O and the articulated connection with the second link 2 in the as-designed position presented in a lateral projection—that is, viewed in the transverse direction of the vehicle—lie inside the rim of the wheel 1, which has, as customary, an air-filled tire, which is pulled in the conventional manner onto the rim. Given the conventional dimensions of the components, it is usually the case that in reality only the first link 3 can be arranged at least partially inside the space defined by the rim, whereas the second link 2 will lie, viewed in the transverse direction of the vehicle, essentially outside the space enclosed by the rim. However, when viewed in the longitudinal direction of the vehicle, the second link 2 can actually be designed in such a way that it is short and, thus, advantageously compact, so that it does not project, when presented in a lateral projection, beyond the rim of the wheel in the transverse direction of the vehicle.

In addition to the above explanations regarding the single wheel suspension, it must be pointed out that when the rotational axis 7\* that extends through the points B, C and that belongs to the two links 3, 2 (or of the corresponding connecting pin 7) is moved into a slightly inclined position, it is possible to produce specific changes in the wheel camber or the wheel toe-in of the wheel 1 in connection with a compression or decompression movement of the wheel 1 relative to the vehicle body 6. For this purpose, the two links 3, 2 only have to be designed and arranged in such a way that the axis of rotation 7\*, extending through the points B, C, must continue to extend more or less in the direction of the transverse axis of the vehicle, but extend in the as-designed position (according to FIG. 1 and viewed in a vertical projection) in such a way that the axis of rotation is slightly inclined relative to this transverse axis of the vehicle and/or extend, when viewed in a projection in the direction of the longitudinal axis of the vehicle, so as to be slightly inclined relative to the horizontal plane. In this context the angular deviation (mentioned above several times) of the planes, in which the links 2, 3 can be pivoted, is also to be understood to mean that this deviation amounts to an angle that is not larger than an angle in a range between 6° and 10° relative to the vertical or relative to the longitudinal direction of the vehicle, respectively.

In the context of an advantageous further development, the articulated connection between the first link 3 and the second link 2—that is, in the area of their mutual axis of rotation 7\* extending through the points B, C—can have a rotational damper element, which influences the movements of the wheel 1 relative to the vehicle body 6, and/or a corresponding rotational spring element. In this case a rotational spring element is defined as a spring element, which is coiled up when force is applied in one direction and, in so doing, stores energy. Then when the force is removed, the rotational spring element moves back to or in the direction of its initial position. A rotational damper element damps in the conventional way a rotational movement of two components relative to each other. These rotational spring and/or damper elements can perform in an especially space-saving way the function of a conventional bearing spring (between the wheel 1 and the vehicle body 6) and/or a vibration damper of a conventional wheel suspension. The advantage of this feature is that in the event of a compression movement or decompression movement of the wheel 1 relative to the vehicle body 6, relatively large pivoting angles or rotational angles of both links 3, 2 relative to each other will occur in this axis of rotation 7. As an alternative or in addition, however, the articulated attachment of the second link 2 at the vehicle body 6, that is, at point A, can have a rotational damper element and/or rotational spring element that influences the movements of the wheel 1 relative to the vehicle body 6.

The articulated connection between the first link 3 and the second link 2 and/or the articulated connection between the second link 2 and the vehicle body (at point A) can be designed in the form of a rubber mounting, which allows small elastokinematic relative movements, so that it is possible to use in a targeted manner the elastokinematic effects with respect to the driving dynamics and the driving comfort of a motor vehicle provided with such a single wheel suspension or a corresponding rear axle.

It has already been discussed that the linkage of the pendulum support 4 on the first link 3 and on the body vehicle 6 is configured preferably in such a way that this pendulum support 4 binds only one kinematic degree of freedom of the wheel suspension. However, this so-called pendulum support 4 can also be designed in the form of a triangular link having an expanded base at point E, that is, the joint region on the vehicle body 6, so that the transverse forces acting on the wheel 1 when the vehicle is moving can be supported not only at point A relative to the vehicle body, but additionally at point E.

It must also be pointed out that the proposed single wheel suspension of a non-steerable wheel of a vehicle can be implemented on both a non-driven rear axle of a vehicle and also at a driven rear axle of a vehicle—in the case of a driven rear axle preferably using the drive concept disclosed in the German Patent application 102009038424.

Figure 4:
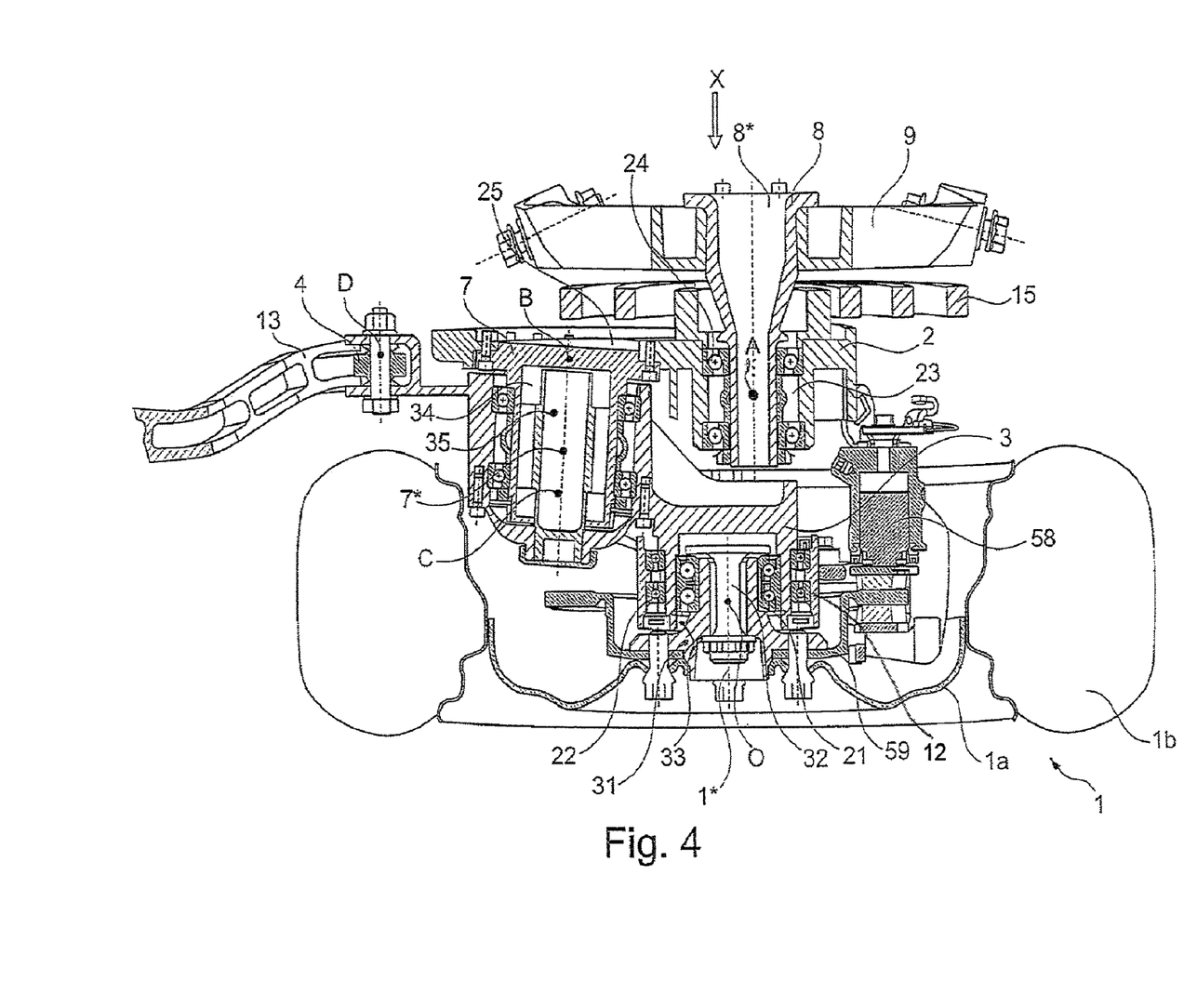
FIG. 4 is a sectional view of an exemplary embodiment taken along section A-A of FIG. 5.
Figure 5:
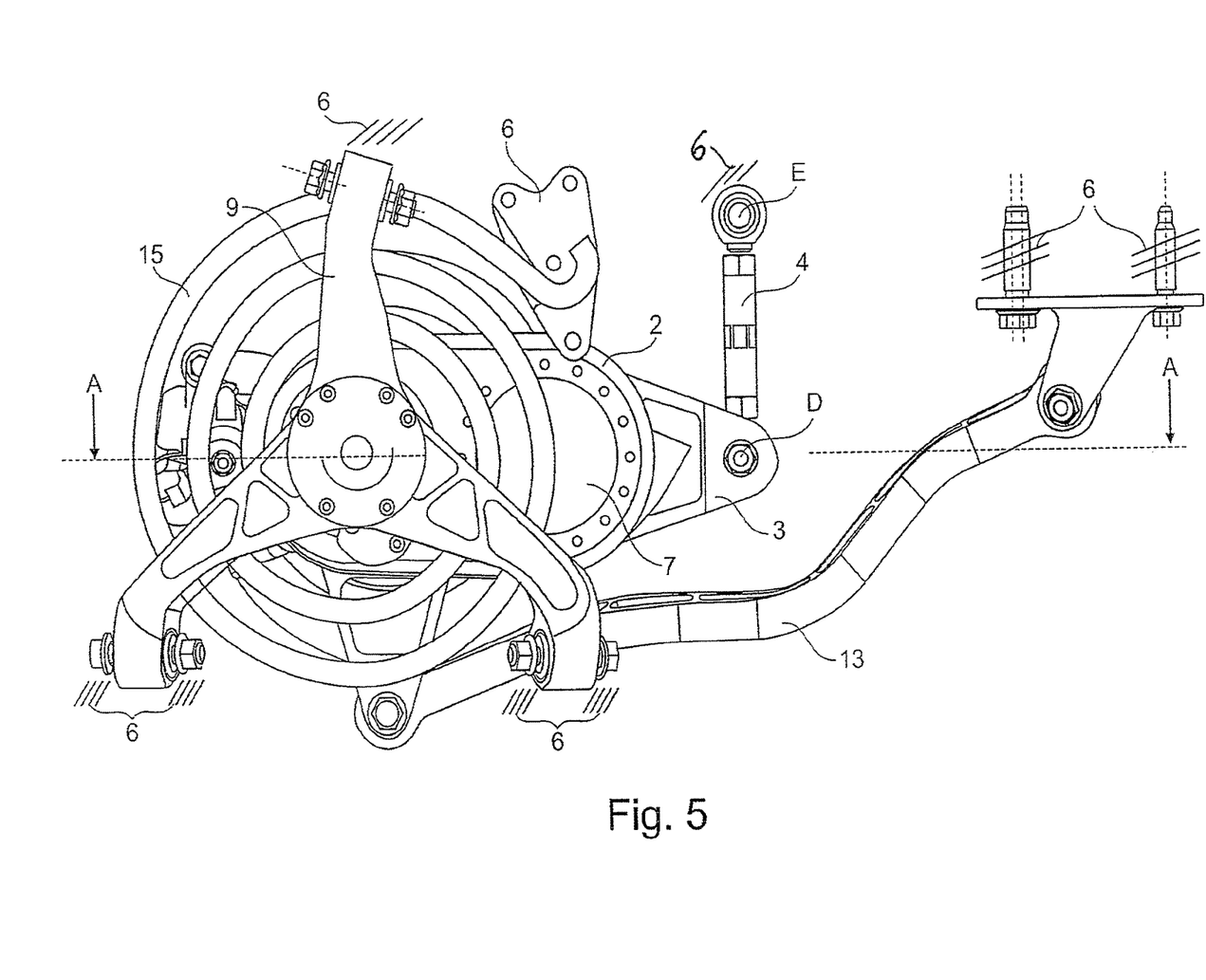
FIG. 5 is a lateral outer side view of an exemplary embodiment.
Figure 6:
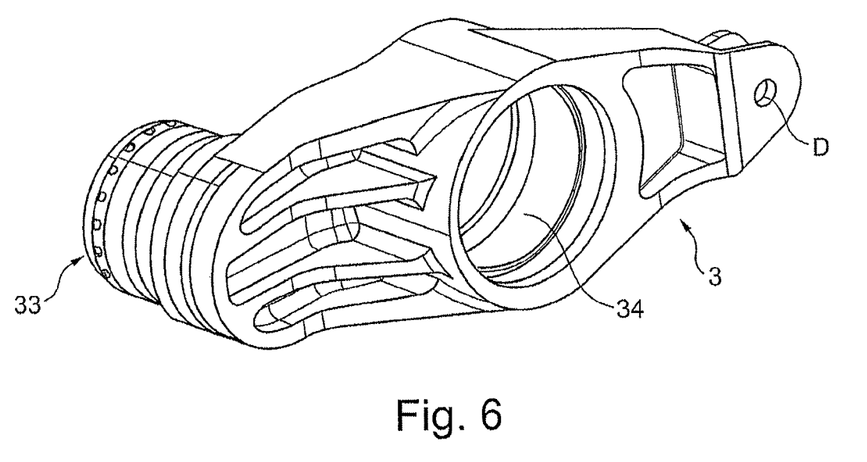
FIG. 6 illustrates a first link of the exemplary embodiment.
Figure 7:
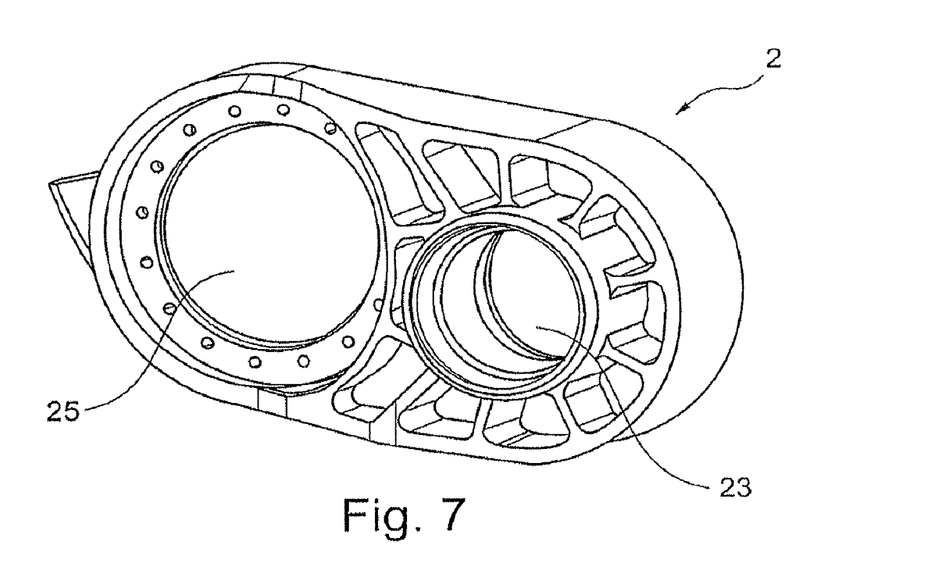
FIG. 7 illustrates a second link in a perspective view of the exemplary embodiment.

Referring to FIGS. 4 to 7, the design of one exemplary embodiment and its essential elements are explained in detail below. In this context FIG. 5 is an outward lateral view (when viewed in the transverse direction of the vehicle; =view X from FIG. 4), whereas FIG. 4 is a sectional view A-A from FIG. 5. FIG. 6 shows the first link, and FIG. 7 shows the second link in a perspective view.

To begin with, FIG. 4 shows very clearly the customary design of a vehicle wheel 1, including the wheel body 1a and the tire 1b mounted on the rim of the wheel body. The wheel body 1a is fastened to a driving flange 31 with several screws/bolts. The driving flange is mounted in a circular cylindrical receptacle 33 of the first link 3 by way of a double row angular contact ball bearing 21 using a mandrel 32. The longitudinal axis 1\* of this mandrel 32 is simultaneously the axis of rotation 1\* of the wheel 1. The first link 3 is shown in a perspective view in FIG. 6. Since this first link 3 carries the driving flange 31 for the wheel body 1a by way of the aforementioned circular cylindrical receptacle 33, this first link 3 acts simultaneously as the wheel carrier (known to the person skilled in the art). In this case, the point O from FIGS. 1 to 3 lies in the middle of the double row angular contact ball bearing 21.

It is especially clear from FIG. 6 that the first link 3 has a (an additional) circular cylindrical cavity 34 that is located approximately in the central area of the first link 3 and that has a cylindrical axis that is the rotational axis 7\* of the articulated connection between the first link 3 and the second link 2. This cavity 34 has the connecting pin 7 (cf. FIG. 4), which has already been explained in conjunction with FIGS. 1 to 3 and which is constructed in this case of multiple parts. With the exception of the information that a rotational damper 35 is integrated in a suitable manner inside this connecting pin 7 and that the pivoting movements of the first link 3 relative to the second link 2 about the axis of rotation 7* can be damped with the rotational damper, an in-depth discussion of the detailed construction of this connecting pin 7 is omitted for the sake of simplicity. However, the aforementioned slightly inclined position of the rotational axis 7* relative to the vehicle transverse direction that extends in the direction of the rotational axis 1* of the wheel 1 is very plain to see in FIG. 4. Furthermore, the points B and C from FIGS. 1 to 3 are shown in FIG. 4. In this projection these points B, C lie essentially in the middle of the second link 2 or the first link 3 on the axis of rotation 7*.

The second link 2 is easy to see not only in FIG. 4, but it is also depicted just by itself in a perspective view in FIG. 7. A larger circular cylindrical passage 25 in this second link 2 serves to accommodate the connecting pin 7, whereas the smaller circular cylindrical passage opening 23 of this second link 2 serves to insert the angular contact ball bearings 24, by which this second link 2 is mounted on a carrier shaft 8 in such a way that the second link can be pivoted about the axis 8* of the carrier shaft. Thus, point A from FIGS. 1 to 3 lies in the center of the (in this case two) angular contact ball bearings 24, which are arranged so as to be mirror inverted. The carrier shaft 8, in turn, is fastened at three points—that is, with the end of each of the altogether three arms of the carrier 9—on the vehicle body 6, which is not shown in detail, by means of a carrier 9, whose shape is especially clear from FIG. 5, but which can also be designed differently. This attachment can be carried out in a rigid manner with screws or can be configured with rubber bearings, so that the elastokinematic relative movements are enabled.

Referring back to the first link 3, its point D, which is depicted in FIGS. 1 to 3 and which lies in the center of the bifurcated free end of the first link 3, is especially easy to see in FIG. 5 and also in FIGS. 6 and 4. The pendulum support 4 is supported on this bifurcated end section; and with its other end at point E (cf. FIG. 5), the pendulum support is supported on the vehicle body 6 (not shown in detail).

Furthermore, FIGS. 4 and 5 show the arrangement of a spring element 15, designed in the form of a helical spring, which acts as the bearing spring between the second link 2 and the vehicle body 6. That is, the bearing spring proportionately supports the vehicle body 6 on the second link 2 (and by way of this second link and the first link 3 on the wheel 1). In this case, this helical spring 15 (or rather this spring element 15) is a so-called rotational spring element—that is, a spring element, which is coiled up when force is applied in one direction, and, in so doing, stores energy and then, when the force is removed, moves back towards or in the direction of its initial position.

Furthermore, FIG. 5 shows, in particular, a so-called brake support 13, by which a so-called brake caliper attachment 12, shown in FIG. 4, is supported on the vehicle body 6. This brake caliper attachment 12, which is externally mounted in a rotatable manner about the rotational axis 1* of the wheel by way of a thin ring angular contact ball bearing 22 on the circular cylindrical receptacle 33, which forms the wheel carrier and which is part of the first link 3, allows a brake caliper 58 to be mounted and supported via the brake support 13 on the brake caliper attachment 12 in interaction with the support of the brake caliper attachment that prevents a rotational movement of the brake caliper attachment 12 about the rotational axis 1* of the wheel, so that this brake caliper 58 can interact in the customary way with a brake disk 59, which is also fastened at the driving flange 31, in order to brakingly decelerate the rotating wheel 1. Such an attachment of the brake caliper 58 offers more freedom in designing the kinematic characteristics, in particular during a braking action, in comparison to an alternative screwing as tightly as possible to the wheel carrier.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A single wheel suspension of a non-steerable wheel of a two track vehicle, comprising:
    first and second links, which are pivotable relative to each other in respective planes, each of said planes being inclined by not more than 10° relative to a longitudinal direction of the vehicle and by not more than 10° relative to a vertical direction; wherein:
        the first link, which extends approximately in the longitudinal direction of the vehicle, is operatively configured as a wheel carrier, in that a wheel bearing is fastened in an end section of the first link in a receptacle,
        the first link is supported at the other end section on a vehicle body via a pendulum support, the pendulum support extending essentially in the vertical direction in an as-designed position,
        the second link, which extends essentially in the longitudinal direction of the vehicle, is supported on one side in an articulated manner on the vehicle body with only one kinematic rotational degree of freedom and on the other side is connected in an articulated connection to the first link between the wheel bearing and a fastening point of the pendulum support with only one kinematic rotational degree of freedom,
        an axis of rotation of the articulated connection between the first link and the second link is slightly inclined relative to at least one of a horizontal and transverse direction of the vehicle in the as-designed position;
    wherein the single wheel suspension requires no other wheel guiding link but includes a connecting element that produces the articulated connection between the first link and the second link.

2. The single wheel suspension according to claim 1, wherein the second link and the first link, including its section between the wheel bearing and the articulated connection with the second link, lie inside the rim of the wheel in the as-designed position in a lateral projection thereof in the transverse direction of the vehicle.

3. The single wheel suspension according to claim 2, further comprising:
    at least one of a rotational damper element and a rotational spring element operatively configured to influence movements of the wheel relative to the vehicle body, the at least one of the rotational damper element and the rotational spring element being provided in the articulated connection between the first link and the second link.

4. The single wheel suspension according to claim 2, further comprising:
    at least one of a rotational damper element and a rotational spring element operatively configured to influence movements of the wheel relative to the vehicle body, the at least one of the rotational damper element and the rotational spring element being operatively arranged in the articulated attachment of the second link at the vehicle body.

5. The single wheel suspension according to claim 1, further comprising:
   at least one of a rotational damper element and a rotational spring element operatively configured to influence movements of the wheel relative to the vehicle body, the at least one of the rotational damper element and the rotational spring element being provided in the articulated connection between the first link and the second link.

6. The single wheel suspension according to claim 5, wherein the articulated connection between the first link and the second link and/or between the second link and the vehicle body comprises a rubber mount allowing elastokinematic relative movements.

7. The single wheel suspension according to claim 1, further comprising:
   at least one of a rotational damper element and a rotational spring element operatively configured to influence movements of the wheel relative to the vehicle body, the at least one of the rotational damper element and the rotational spring element being operatively arranged in the articulated attachment of the second link at the vehicle body.

8. The single wheel suspension according to claim 7, wherein the rotational spring element is a helical spring.

9. The single wheel suspension according to claim 7, wherein the articulated connection between the first link and the second link and/or between the second link and the vehicle body comprises a rubber mount allowing elastokinematic relative movements.

10. The single wheel suspension according to claim 1, wherein the articulated connection between the first link and the second link and/or between the second link and the vehicle body comprises a rubber mount allowing elastokinematic relative movements.

11. The single wheel suspension according to claim 1, further comprising:
    a carrier fastenable on the vehicle body via a rubber mount allowing for elastokinematic relative movements; and
    wherein the second link is mounted in a rotatable manner on the carrier.

12. The single wheel suspension according to claim 1, wherein a linkage of the pendulum support at the first link and at the vehicle body is operatively configured such that the pendulum support binds only one kinematic degree of freedom of the single wheel suspension.

13. The single wheel suspension according to claim 1, wherein the pendulum support comprises a triangular link having an expanded base at a linking point on the vehicle body, wherein via the triangular link transverse forces acting on the wheel when the vehicle is moving are additionally supported at the linking point.

14. The single wheel suspension according to claim 1, further comprising:
    a brake caliper attachment mounted on the receptacle of the first link;
    wherein the brake caliper attachment is supported on the vehicle body via a brake support; and
    further wherein the brake support carries a brake caliper that interacts with a brake disk.

* * * * *